May 6, 1969 TORAHIKO HAYASHI 3,442,226

CAKE AND BREAD MATERIAL MAKING DEVICE

Filed Dec. 5, 1966

INVENTOR.
TORAHIKO HAYASHI
BY Kenwood Ross
ATTORNEY.

INVENTOR.
TORAHIKO HAYASHI
BY Kenwood Ross
ATTORNEY.

INVENTOR.
TORAHIKO HAYASHI
BY Kenwood Ross
ATTORNEY.

INVENTOR.
TORAHIKO HAYASHI
BY Kenwood Ross
ATTORNEY.

INVENTOR.
TORAHIKO HAYASHI
BY Kenwood Ross
ATTORNEY.

United States Patent Office 3,442,226
Patented May 6, 1969

1

3,442,226
CAKE AND BREAD MATERIAL MAKING DEVICE

Torahiko Hayashi, 2–3 Nozawa-cho, Utsunomiya-shi, Tochigi-ken, Japan

Filed Dec. 5, 1966, Ser. No. 599,193
Claims priority, application Japan, Mar. 16, 1966, 41/5,846; Mar. 22, 1966, 41/17,266
Int. Cl. A21c 3/04
U.S. Cl. 107—1 2 Claims

ABSTRACT OF THE DISCLOSURE

A cake or bread making device for continuously molding and delivering cake or bread or similar material in the shape of a bar.

Figures 1, 2:
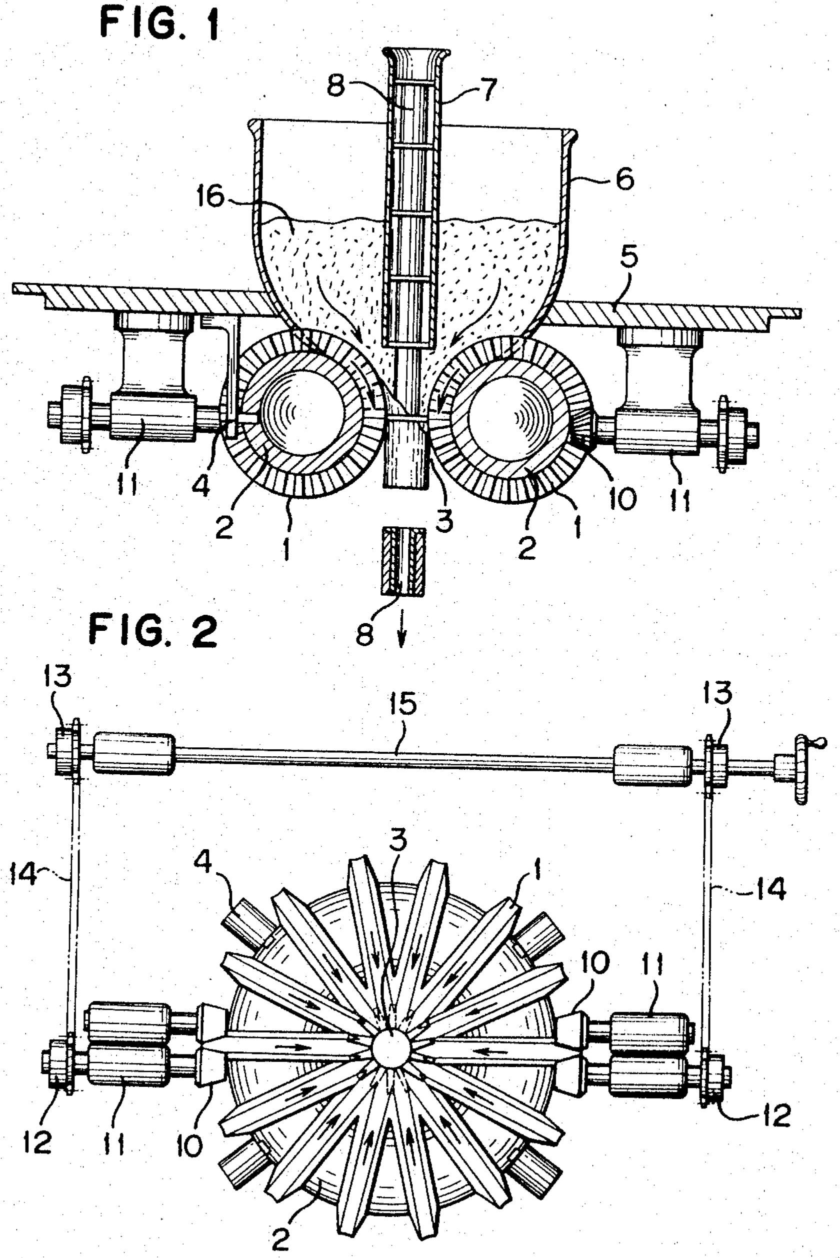

This invention relates to a cake or bread material making device for continuously molding and delivering bread or similar cake material or viscous material in the shape of a bar.

As for the device for delivering viscous material in the bar-shape such, as bread dough or cake material, no use has ever been made practical except for the type fitted for pushing out the material from the fixed delivery outlet by means of piston or other pressure means, and this has been due to various difficult troubles caused by the viscosity of material.

It is an object of this invention to provide a cake or bread material making device which permits achievement of a continuous molding of material in a bar-shape simply and exactly without the inconvenience of operation encountered in conventional piston type extrusion systems and without unnecessary great pressure and accompanying deterioration of quality of material such as the separation of water, the crystal precipitation of the sugar, and the destruction of the composition of the bread dough in fermentation.

According to this invention, a cake or bread making device is provided in which a large number of gears, each having bevel teeth on both of its sides, are circumferentially-arranged in a ring-shape to define a delivery outlet in the center of the ring, and the material fed over and past the gears is molded in a bar-shape as large in size as the diameter of the delivery outlet for continuously delivering the material therefrom.

The viscosity usually encountered in the molding of viscous materials leads to the destruction of the material which occurs when the material leaves the mold. The force, in delivering the material, by the rotation of the double blade bevel gears, encounters frictional resistance due to the adhesiveness of the material being worked, but the pressure in the supply tank is such as to force the material between the teeth of the gears, resulting in a resistance of the material seizing on the double blade bevel gears.

The crest surface of each tooth on the outer periphery of each double blade bevel gear, although small, does not serve to reduce the feeding capacity. Even if oil were applied on each surface, furthermore, no loss of feeding capacity, due to slippage ensues.

As the area of adhesion is small by virtue of the use of the double blade bevel gears, it is possible to minimize material destruction. In this invention, the fact that no adhesion trouble is experienced is due to the small adhesion area wherefore the destruction of material is small.

In one practical application of this invention in the molding of material into a bar of 30 mm. diameter, it was possible to avoid destruction of the material by using a kneaded material having a composition comprised of parts by weight of flour, 100 parts, sugar, 50 parts, and

2 water, 35 parts, and where the surface area of the outer periphery or crest of each tool of the gears was 8 square millimeters. When a small amount of butter was added, material destruction was avoided when the surface area of the outer periphery of each tooth was 20 square millimeters.

This invention contemplates use of large number of gears, each having bevels on both of its sides and arranged in the ring-shape, wherefore troubles of viscosity are completely eliminated. That is to say, the outer peripheries or crest of the double blade bevel gears unisonly define a plane surface. At the delivery outlet the plane surfaces of the crests of the several gears define a cylinder.

A further object of this invention is to provide a cake or bread making device for delivering material of bar-shape, so as to allow more rapid formation into the pipe-shaped products which, after being baked, are filled with cream, minced meat, sausage or the like in the central hollow areas and formed into so-called sandwiches. When delivering the bar-shaped material, the pipe-shaped material of definite size can be rapidly and continuously formed merely by delivering a metal core of the pipe-shape and having a flange of the same shape as the delivery outlet at one end through a core guide.

Figure 3:
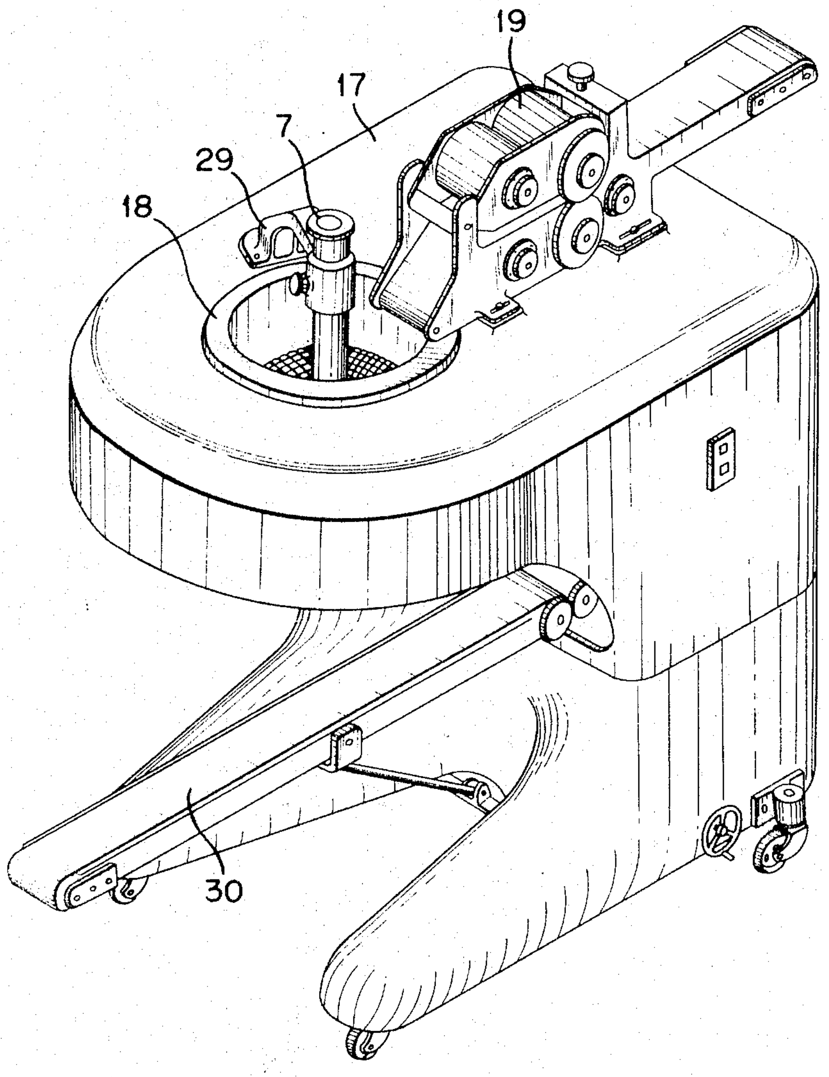
Figure 4:
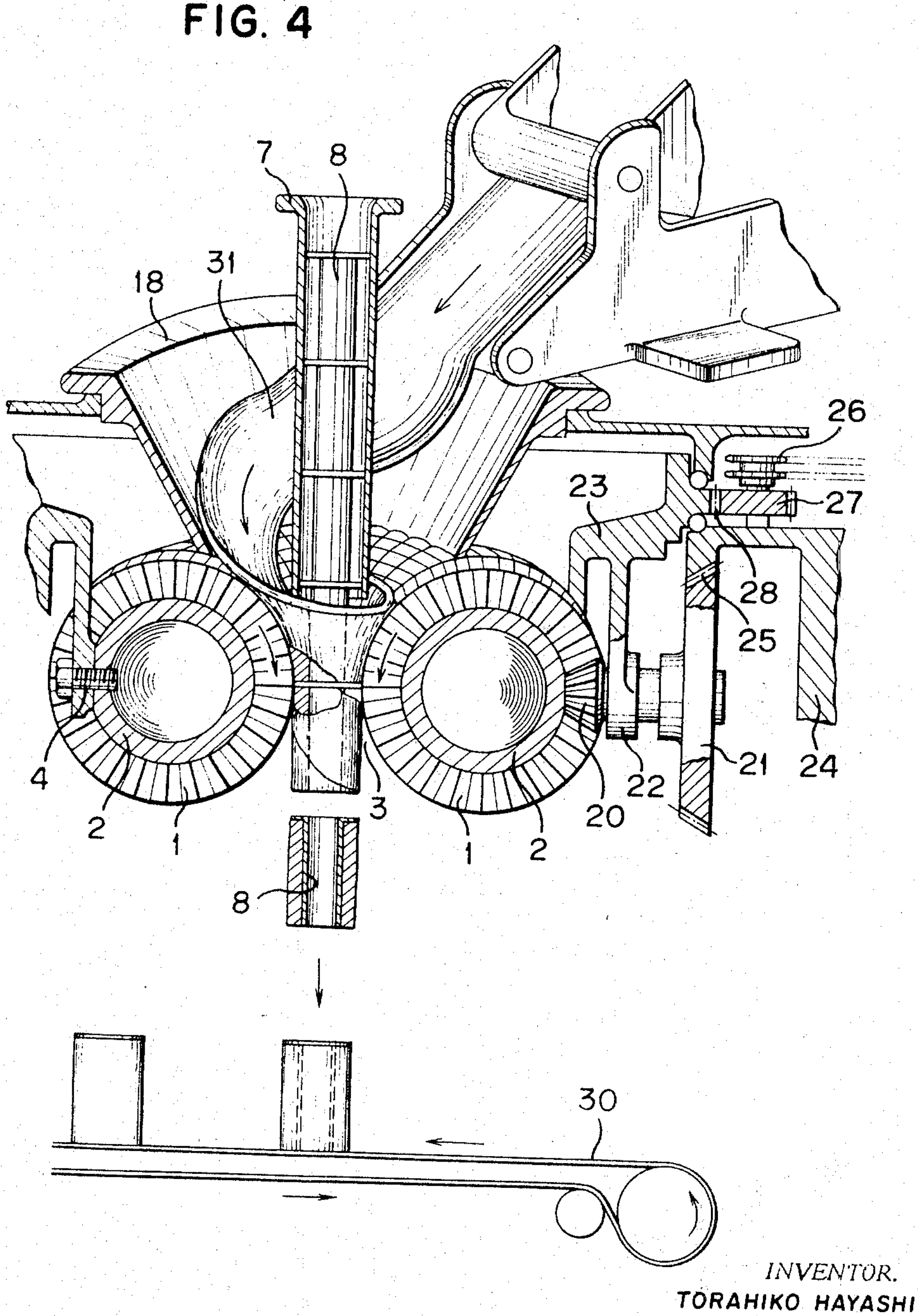
Figure 5:
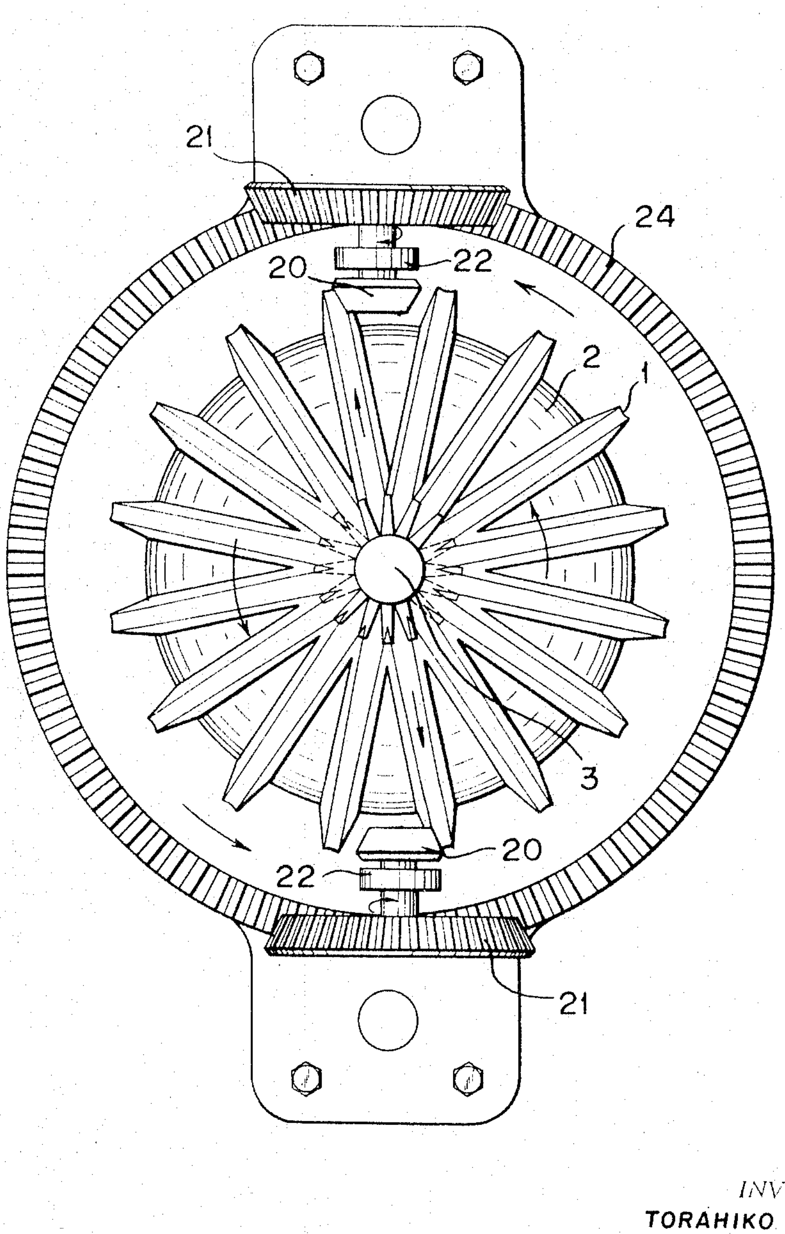
Figure 6:
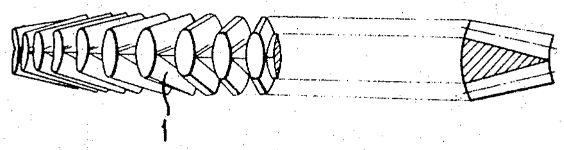
Figure 7:
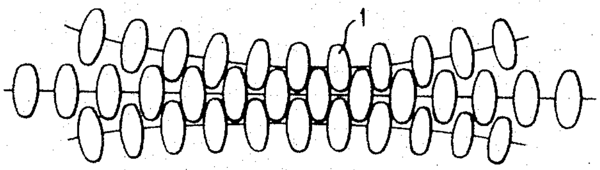
Figure 9:
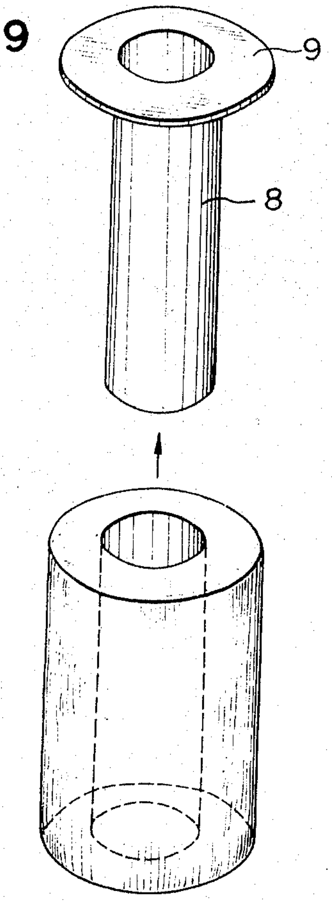
Figure 8:
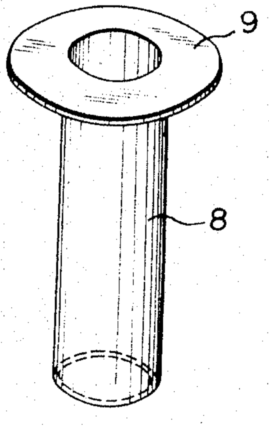

In order that this invention may be clearly understood and readily carried into effect it will now be more fully described with reference to the accompanying drawings, in which: FIGURE 1 shows a preferred device for making cake or bread material into a pipe-shape. FIGURE 2 is a plan view of the device of FIG. 1 with its material tank and base removed. FIGURE 3 is a perspective view of a modified form of device employed with material rolled into a belt form for manufacturing the same into a pipe-shape. FIGURE 4 is a vertical transverse cross section of the modified device of FIG. 3. FIGURE 5 is a view of the lower surface of the main part of the device of FIGS. 3 and 4. FIGURE 6 is a partial perspective view of a double blade bevel gear of the invention. FIGURE 7 is a plan view of several double blade bevel gears working in mesh with each other. FIGURE 8 is a perspective view of a metal core. FIGURE 9 is an exploded perspective view showing a metal core which has been removed from a pine-shaped product.

Referring now to the drawings, FIGURES 1 and 2 exemplify the device into which a cake or bread material, kneaded with a flour and water mixture is fed. A plurality of double blade bevel gears 1, each having bevel teeth on both of its sides, is provided. As shown in FIGURE 6, the teeth on a side of a gear are formed so as to interdigitate with the teeth on the adjacent side of the next adjacent gear at their outer diameters and a large number of teeth are provided so as to define a relatively small plane surface on the outer periphery of each tooth wherefore the plane surfaces of adjacent teeth can be interdigitated with each other.

These double blade bevel gears 1 are fitted to a ring-shaft 2 and are disposed in a ring-shaped arrangement so that they mesh and rotate with each other in synchronism, each gear being journalled on the ring-shaft. Thus, by arranging the double blade bevel gears 1 in the ring form, there is defined a delivery outlet 3 circumscribed by the double blade bevel gears 1. Through this delivery outlet 3, the material 16 is discharged, the diameter of said delivery outlet being identical with that of the material 16 processed therethrough. The ring-shaped shaft 2 depends from a base 5 by means of a holder 4. Above the double blade bevel gears 1, there is provided a material tank 6, the bottom of which opens into the double blade bevel gears. Within the material tank 6 a core guide 7 of circular pipe-shape is held by a support frame (not shown) fixed to the base 5 so that a sufficient passage for the material to the delivery outlet 3 is defined between the lower end of the core guide 7 and the double blade bevel gears 1. A metal core 8 consists of a pipe having at one end a flange 9 of the same shape as the delivery outlet 3. The flange 9 is made sufficiently large so as to be capable of passing through and contacting the double blade bevel gears 1 and the length of the pipe corresponds to that of the cake or bread being manufactured, said pipe being a cylinder, if desired. This metal core 8 is inserted into the core guide 7 with the flange 9 being uppermost.

10 denotes sets of gears for rotating the double blade bevel gears; 11 denotes the bearings thereof; 12 and 13 denotes sprockets for driving the gears 10; 14 denotes connecting chains; and 15 denotes a main shaft to which power is transmitted from a hand crank on one of its ends.

By rotating the double blade bevel gears 1 in the direction of the arrows in FIGURE 1 and with the material 16 in the material tank 6 and with metal core 8 inserted in the core guide 7, the material 16 will wind around the pipe part of the metal core 8 and will enter the delivery outlet 3, where the flange 9 of the metal core 8 will pass in contact with the double blade bevel gears 1 and the material 16 will be cut. The material, equivalent in diameter to the diameter of the flange 9 of the metal core 8 and a length of the pipe falls together with the metal core 8 and becomes a product of the pipe shape of definite size, and in turn winds about the metal core 8. Thus, products of definite size and of the pipe-shape are continuously obtained. The product is baked without being further processed and thereafter is pulled off the metal core 8. The hollow part of the product after the metal core 8 has been drawn out is filled with cream, minced meat, sausage, or the like, as desired.

FIGURES 3 and 4 show a modified form of device in which mixed and kneaded cake or bread material is rolled and fed in the form of a belt and manufactured into a pipe shape. Particularly, this method of production is suitable for the making of pies. This construction comprises the double blade bevel gears 1, each fitted upon the ring shaft 2 and disposed in a ring arrangement, with the delivery outlet 3 formed in the center circumscribed by the double blade bevel gears 1 and with the metal core 8 being inserted into the core guide 7 which with respect to the delivery outlet 3 is same as that shown in the FIGURE 1 exemplification. However, rolls 19, provided on a fixed base 17 of the outer casing, lead to a material receiver 18 having its bottom opened above the upper surface of the double blade bevel gears 1 in order to roll the material in a belt form. As regards pie material in which flour and butter form a layer, it is necessary to wind the material about the metal core 8 in such a way that the layer will not be broken wherefore the double blade bevel gears 1 are disposed in the ring shape arrangement so that they can be rotated inwardly in meshing with each other as shown in FIGURE 1, and simultaneously all the double blade bevel gears 1 are turned in the transverse direction, as shown by the arrow in FIGURE 5. That is to say, bevel pinions 20 for rotating the double blade gears 1 and the bearings 22 of the shafts fixed with bevel gears 21 on the other end are fixed on a transversely rotating plate 23 together with the holder 4 of the ring shaft 2, and the bevel gears 21 will rotate with the transversely rotating plate 23 in mesh with the circular teeth 25 of the fixed frame 24 encircling the double blade bevel gears 1 of a ring-shape combination. Shaft 2 is not connected with fixed frame 24 through bevel pinions 20, bearings 22, and bevel gears 21. On the upper surface of the fixed frame 24, there is pivoted a gear 27 rotatable by a sprocket 26 so that the gear 27 can rotate the transversely rotating plate 23 in mesh with the teeth 28 provided on the outer periphery of the transversely rotating plate 23; 29 denotes a support frame of the core guide 7; 30 denotes an endless belt for carrying the pipe-shaped material; and 31 denotes a belt-shaped material.

When the gear 27 is rotated by the sprocket 26, the transversely rotating plate 23 will rotate, and accordingly, the double blade bevel gears 1 in the ring-shape combination will rotate in the same direction (shown by the arrow in FIGURE 5), and by the rotation of the bevel gears 21, the bevel pinions 20 rotate the double blade bevel gears 1 of the ring shape combination inwardly (in the direction of the arrow shown in FIGURES 4 and 5), whereupon the material is fed as a belt-shaped material 31 by the roll 19, and simultaneously the metal core 8 is inserted into the core guide 7. Then the belt-shaped material 31, by the transverse rotation of the double blade bevel gears 1 in the ring-shape combination, winds about the pipe part of the metal core 8 and enters the delivery outlet 3 and is manually cut off as the flange of the metal core 8 passes in contact with the double blade bevel gears 1 at the delivery outlet 3. The belt-shaped material 31 has a diameter equivalent to that of the flange of the metal core 8 and the length of the pipe falls together with the metal core 8 so that the material 31 converts into the pipe-shaped material of definite size. The belt-shaped material 31 in turn winds about the metal core 8 and in the same way the pipe-shaped material of definite size is continuously delivered by an endless belt 30.

The product is then baked and drawn off the metal core and the hollow part of the product is filled with cream, minced meat, sausage or the like.

According to this invention, the frictional resistance caused by the adhesiveness of the material and the resistance from seizure of each tooth of the double blade bevel gears 1 upon the material work effectively to exert a great force for feeding the material.

I claim:

1. A cake or bread material making device for forming bread dough or similar cake material into a bar-shape consisting of, a plurality of gears meshing and rotating in unison and each having bevels on both sides with the plurality thereof being disposed in a ring-shaped arrangement, and a delivery outlet formed in the center of the arrangement, and a plurality of metal cores each having a flange on one end of the same size as the delivery outlet, and a guide disposed toward the delivery outlet for continuously delivering successive metal cores to the delivery outlet, with the material being fed over the gears and toward the delivery outlet and wound about each metal core and molded into pipe-shapes each of a length corresponding to that of the metal core for continuous delivery from the delivery outlet.

2. In the device as set forth in claim 1, with the gears being rotated inwardly, and means for simultaneously rotating the gears laterally, with the material of a belt-shape being wound about each metal core and molded into a pipe-shape of a length corresponding to that of the metal core.

References Cited

UNITED STATES PATENTS 2,580,726 1/1952 Brewer ............... 107—1

FOREIGN PATENTS 1,281,871 12/1961 France.

WALTER A. SCHEEL, *Primary Examiner.*

JOSEPH SHEA, *Assistant Examiner.*

U.S. Cl. X.R.

18—12, 13